Figure 8:
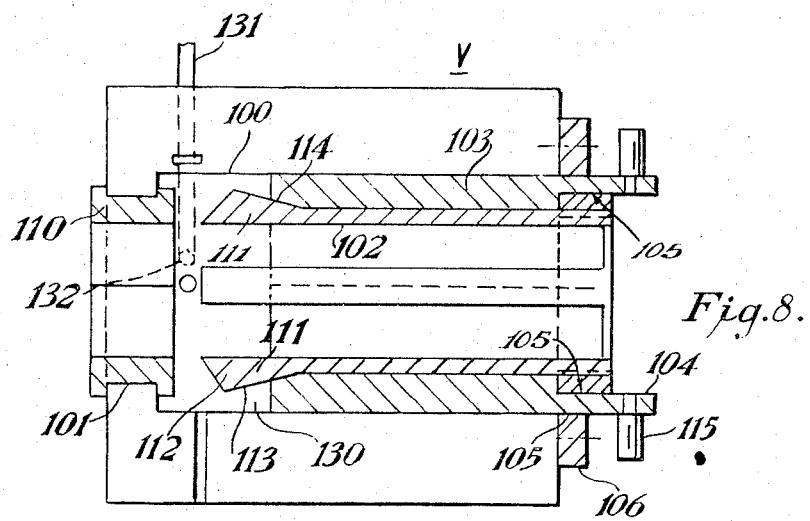

Feb. 6, 1968   P. H. GILL   3,368,006
METHOD AND APPARATUS FOR PROVIDING MOULDED JOINTS OR REPAIRS
Filed Oct. 30, 1963   7 Sheets-Sheet 1
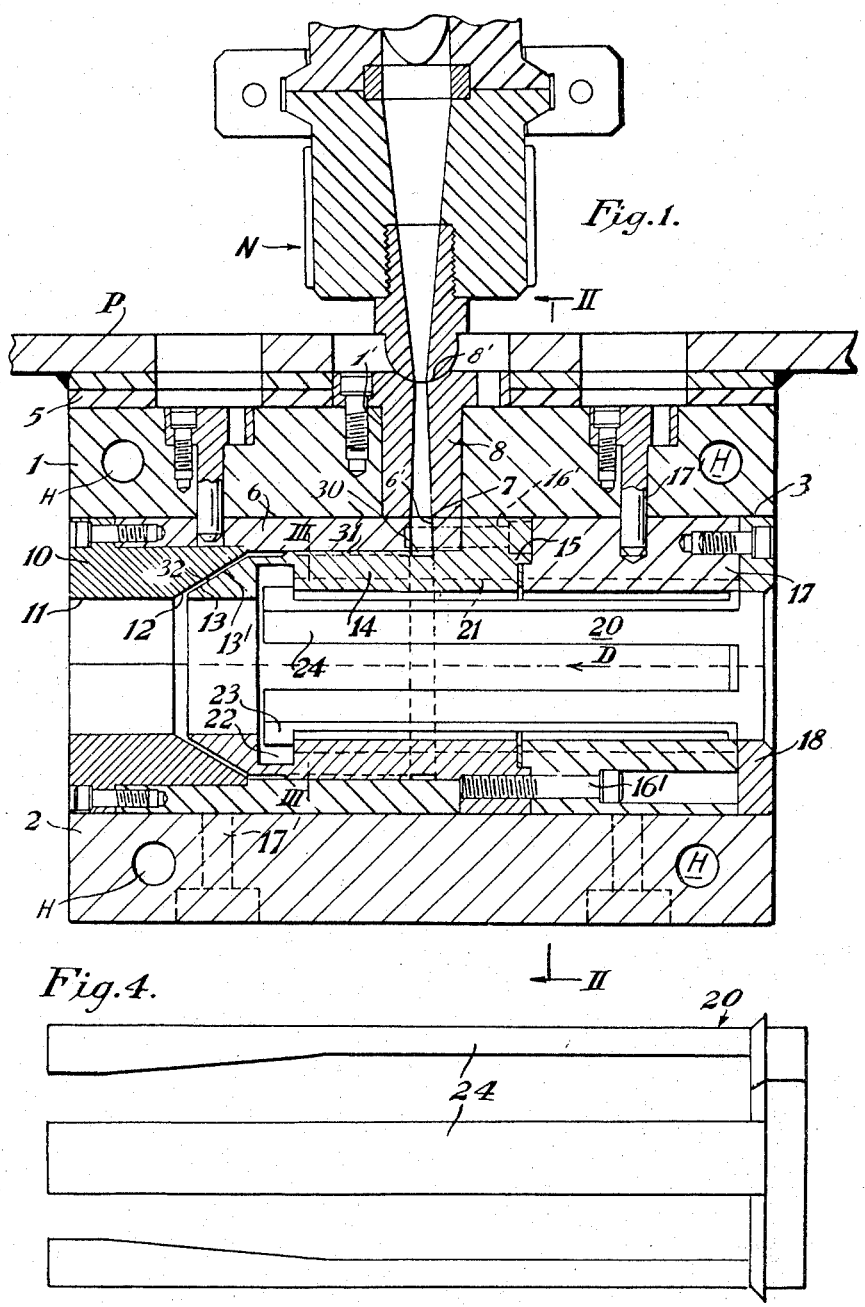

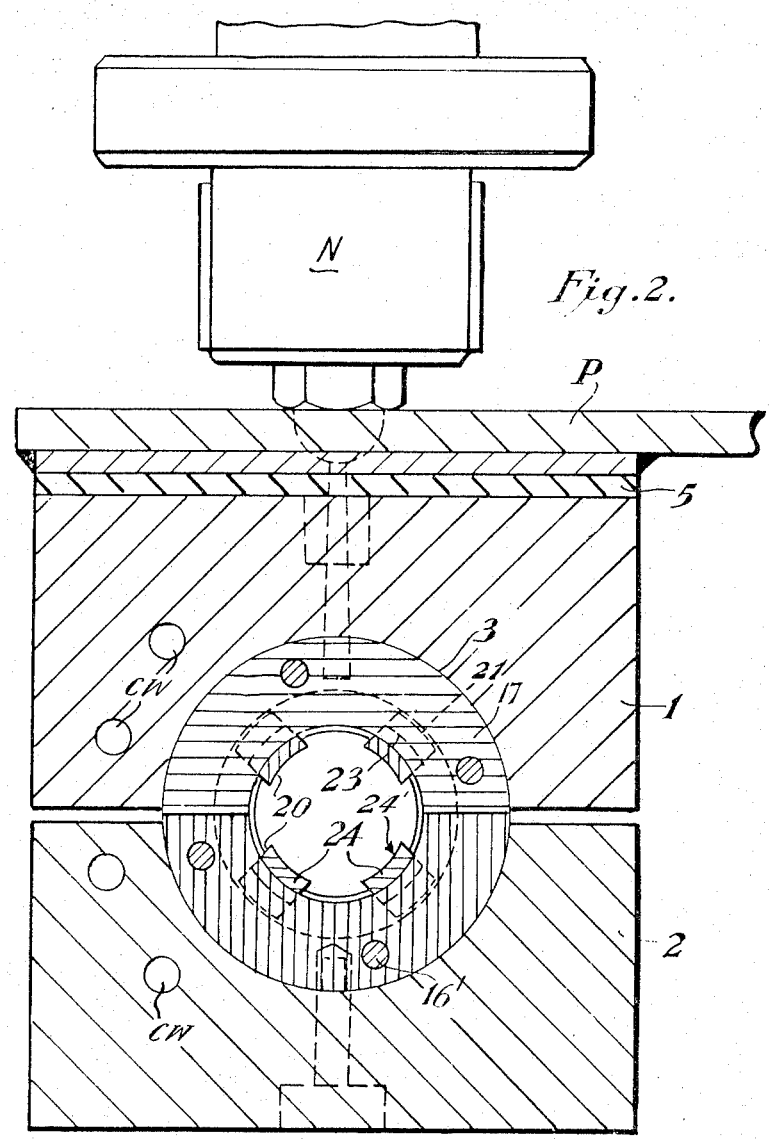

Feb. 6, 1968 P. H. GILL 3,368,006
METHOD AND APPARATUS FOR PROVIDING MOULDED JOINTS OR REPAIRS
Filed Oct. 30, 1963 7 Sheets-Sheet 3

Inventor:
Peter Herbert Gill
BY Baldwin & Wight
Attorneys

Feb. 6, 1968  P. H. GILL  3,368,006
METHOD AND APPARATUS FOR PROVIDING MOULDED JOINTS OR REPAIRS
Filed Oct. 30, 1963  7 Sheets-Sheet 4

Inventor:
Peter Herbert Gill
BY Baldwin & Wight
Attorneys

Inventor:
Peter Herbert Gill
BY Baldwin & Wight
Attorneys

Feb. 6, 1968  P. H. GILL  3,368,006
METHOD AND APPARATUS FOR PROVIDING MOULDED JOINTS OR REPAIRS
Filed Oct. 30, 1963  7 Sheets-Sheet 6
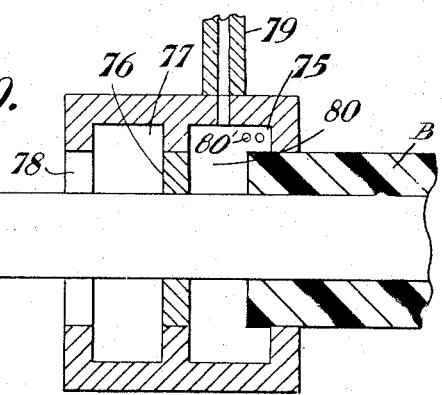
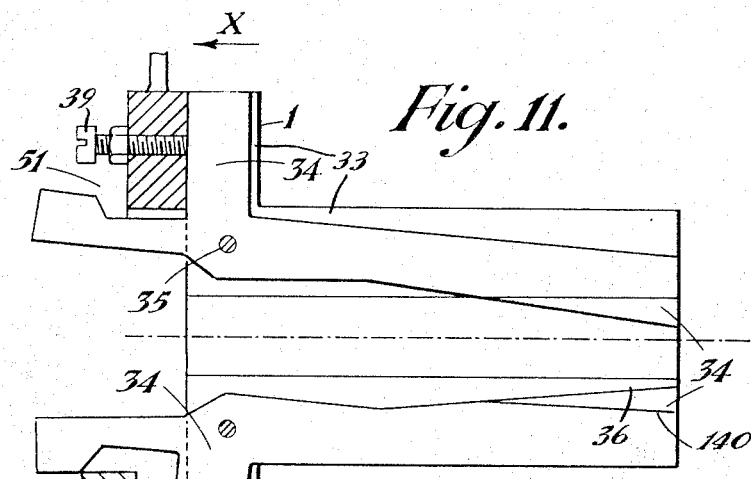
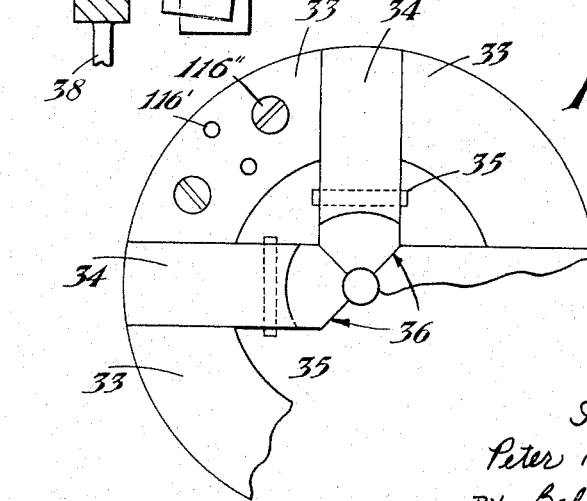
Inventor:
Peter Herbert Gill
BY Baldwin & Wight
Attorneys

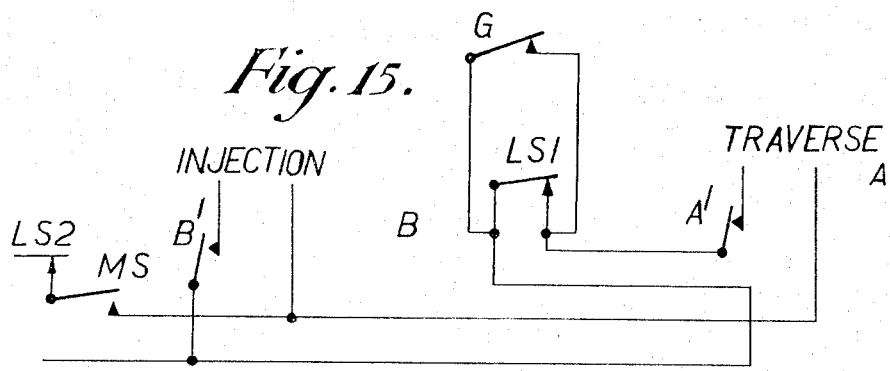
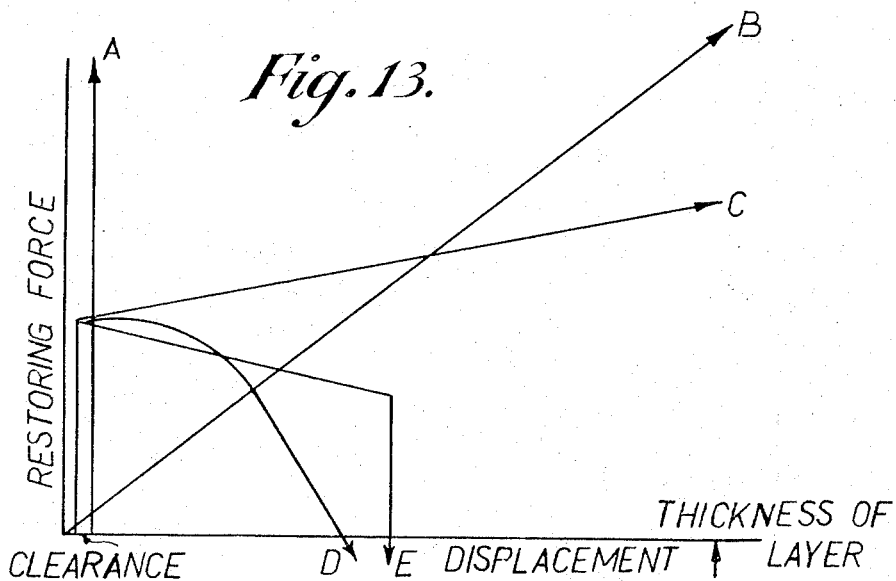
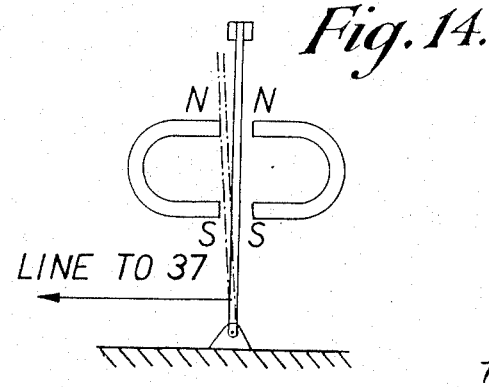

United States Patent Office 3,368,006
Patented Feb. 6, 1968

3,368,006
METHOD AND APPARATUS FOR PROVIDING MOULDED JOINTS OR REPAIRS
Peter Herbert Gill, Welling, Kent, England, assignor to Submarine Cables Limited, London, England, a corporation of Great Britain
Filed Oct. 30, 1963, Ser. No. 320,127
9 Claims. (Cl. 264—36)

This invention relates to an improved method and apparatus for providing moulded joints or repairs in the thermoplastic insulation or sheathing of electric cables, particularly light-weight or armourless submarine cables, where only that portion of the cable whose thermoplastic insulation or sheathing is to be jointed or repaired, is conveniently accessible, but not the distant ends thereof.

As in British Patent 921,902, the method is particularly useful when the portion of insulation or sheathing to be jointed or repaired is relatively long, for example of the order of 100 diameters or more. Relatively short portions of the order of 10 diameters or less, can be carried out by well-known moulding methods.

In the following description and the appended claims, the expression "conductor member," where the context permits, should be read as referring either to the inner conductor or its return conductor i.e. the object to be insulated or sheathed since the layer of plastic material enclosing the inner conductor is generally known as the insulation and that surrounding the return conductor as the sheath.

To assist in an understanding of the invention various circumstances, in which joints or repairs to submarine cables become necessary, can be divided into three classes, namely:

(a) Joints between two separate lengths of cable; this operation may be required in the factory or on a cable ship. In this case only the sheath is re-instated by the method of this invention or that of British Patent 921,-902. The insulation of the inner conductor is replaced by injection moulding in the well-known way.

(b) Replacement of a length of insulation of the inner conductor during manufacture of a cable.

(c) Replacement of a length of sheathing of the return conductor during manufacture of the cable.

In case (a) when it is required to join two lengths cable, it is necessary to make separate and successive joints in the inner conductor, insulation, return conductor, corrosion protection tape, outer screen and protective thermoplastic sheathing. In order to obtain satisfactory joints for the inner components of the cable, it is necessary to remove increasingly longer lengths of the remaining outer components, so that when the outer sheathing has been bared to expose all the components below it, a relatively long length, perhaps 30-40 feet, has to be reinstated. (For the purposes of this specification, the return conductor, corrosion protection tape and screen will be regarded as one component, the "return conductor".) The short length of conductor insulation can be replaced by conventional moulding techniques, but the thermoplastic sheath cannot easily be treated in the same way. The use of a long mould leads to difficulties in maintaining location of the inner components during moulding, avoidance of damage to the insulation, e.g. by oxidation or bubbles due to prolonged heating, or by the injection of sheath material into the insulation.

In cases (b) and (c) the whole purpose of the repair operation is in fact to avoid a splice. The insulated core of a submarine cable is normally manufactured in lengths of several nautical miles. After the insulation has been extruded, it is inspected and as a result a defect, sometimes of considerable lengths may be discovered.

Should this defect be near an end of the cable length, it can be removed by cutting off a piece of core and scrapping it, but should it be in the middle, normally it is necessary to scrap the entire manufactured length since extra joints are not permissible. This situation corresponds to case (b) above, to which this invention is applicable.

At a later stage in manufacture the sheath is similarly inspected after extrusion. Similar considerations apply should a defect be discovered, since an unnecessary joint in the return conductor, insulation and inner conductor must be avoided. (See case (c) above.)

The method and apparatus for forming a joint or repair in the thermoplastic sheathing or insulation of a submarine or other electric cable which is the subject of British Patent 921,902, makes use of a two-part mould unit, within the inner chamber of which is mounted an annular mandrel of predetermined size, namely the inner diameter of the outer sheath. The outer sheath can then be reinstated by moving the mould unit lengthwise of the bared or exposed section of the cable, the sheath of which is to be replaced.

In the construction disclosed in British Patent 921,902, provision is made for supporting the mould unit for movements relative to the cable and in the embodiment described and illustrated in the drawings, the mould unit is supported, e.g. by guide rods so that it can be moved lengthwise of the cable undergoing reinstatement of the outer sheath.

In practice it has been found that on reaching the end of the section of the cable, further movement of the mould unit is not possible, accordingly it has been necessary to make use of a second mould in order to complete the final, comparatively short length of sheath, which remains between the end of the mandrel of the mould unit and the existing sheath of the cable. It will be understood that owing to the fact that the inner diameter of the mandrel, which forms part of the mould unit, matches the inner diameter of the sheath, further movement of the mould unit along the cable becomes impossible, its movement being restricted to that part of the cable where the sheath is removed.

Whereas the method disclosed in British Patent 921,-902 can be applied to all three cases, the reinstatement cannot be carried out in a single operation. The fact that two operations are required increases the risk of a fault. The primary object of the present invention is to provide a method and apparatus which enables the reinstatement to be effective in one instead of two separate operations. However, it has been found desirable to use two different designs of moulding tool, one for sheathing as in cases (a) and (c), and another for insulation, case (b). The difference in design is rendered necessary not only from the difference in dimensions, but also from the relative thicknesses of the thermoplastic layers. Whereas the sheath is relatively thin compared with its mean diameter, this is not the case for the insulation.

According to the present invention, a method of forming a joint or repair in the thermoplastic insulation or sheathing of the conductor member of an electric cable or the like comprises enclosing that exposed portion of the conductor member, to which the thermoplastic layer is to be applied, in a demountable mould having an extrusion chamber which is of a length shorter than the length of material to be reinstated, the said mould chamber having, in coaxial alignment, an entrance die of variable diameter, which is adjustable within a range including the inner and outer diameters respectively of the thermoplastic layer to be applied, and an exit die whose diameter remains constant and is substantially equal to the external diameter of said layer, locating the conductor member and the mould chamber so that at the start of the operation one end of the existing plastic layer is introduced into the exit die, injecting thermoplastic material in a molten condition into the mould chamber so that it unites with the thermoplastic layer at said one end, effecting relative movement of the mould with respect to the conductor member longitudinally relatively to the conductor member so that the latter enters by the entrance die and leaves with the thermoplastic layer in position at the exit die, the entrance die operating to maintain the conductor member in an axial position during extrusion and when the second end of the thermoplastic layer is encountered permitting it to enter the mould chamber and unite with the molten plastic.

In carrying out the invention the mould unit is preferably held stationary and the cable is drawn through the mould chamber.

According to a further feature of the invention, a mould unit for effecting a joint or repair in the insulation or sheathing of the conductor member of an electric cable or the like comprises a split cross head having a bore providing an extrusion chamber, in which, in use, the conductor member is enclosed, said chamber having at its exit end an extrusion die of constant diameter corresponding to the outer diameter of the thermoplastic layer to be reinstated and at its inlet end a collet or mandrel having axially extending fingers capable of adjustment or a retractable die and whereby, in operation, reinstatement of the thermoplastic layer is possible over the entire length of the conductor member to which the thermoplastic layer is to be applied, the range of adjustment of the collet, mandrel or die being such that its minimum and maximum diameters correspond to the inner and outer diameters respectively of the thermoplastic layer to be reinstated.

The invention is illustrated in the accompanying drawings in which

Figure 3:
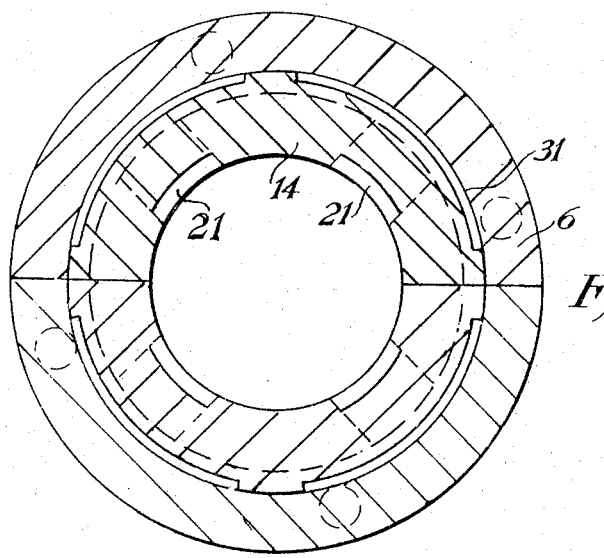
Figure 5:
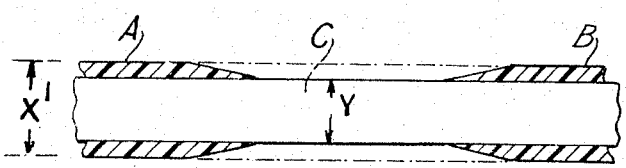
Figure 9:
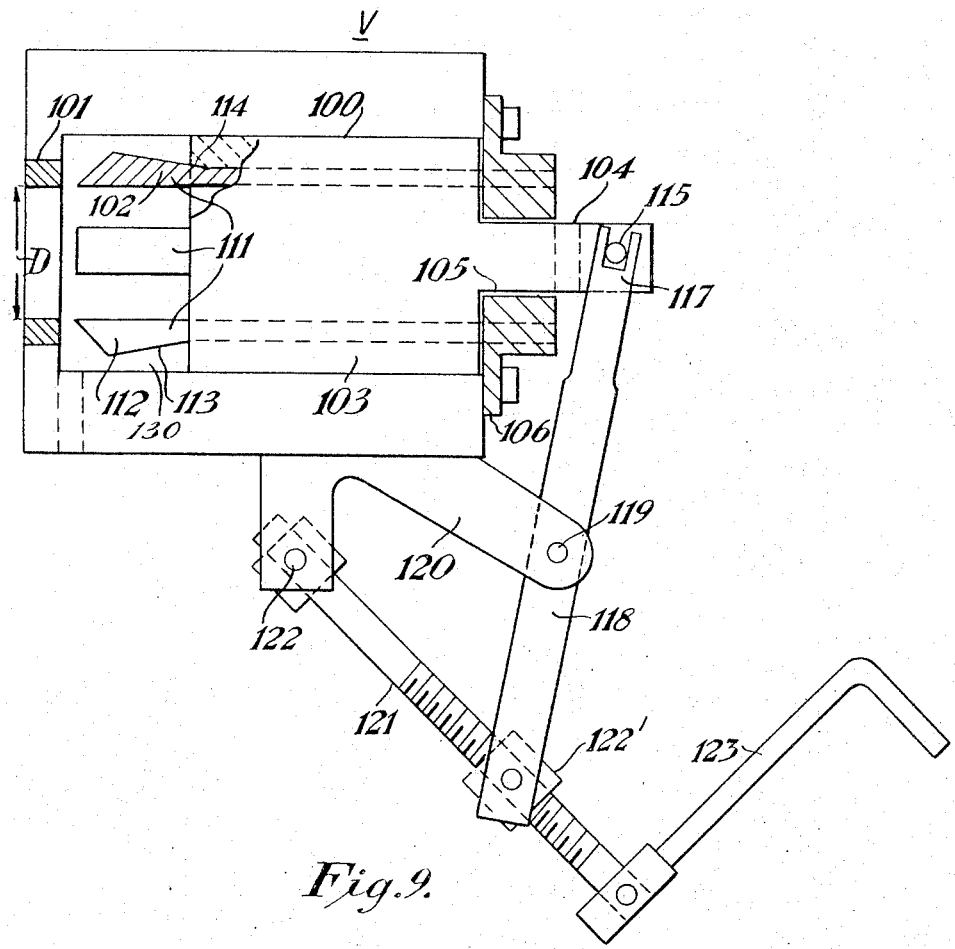
Figure 6:
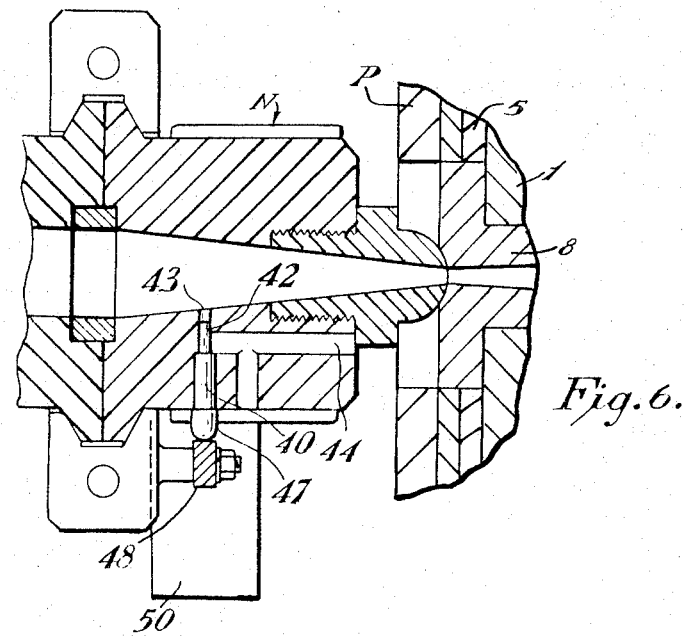
Figure 7:
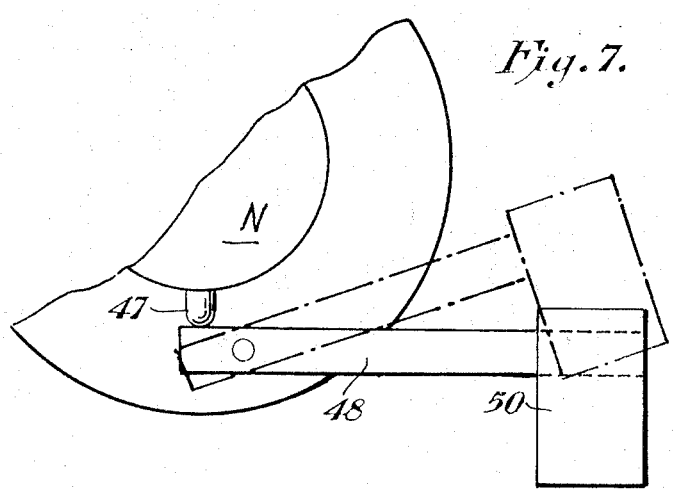

FIGURE 1 is a horizontal longitudinal axial section of a cross-head unit fitted with a mandrel and extrusion head intended primarily for the reinstatement of the thermoplastic sheathing of electric cables, FIGURE 2 is a transverse section on the line II—II of FIGURE 1, FIGURE 3 is a detail section on the line III—III of FIGURE 1, FIGURE 4 is an elevation of the mandrel in accordance with the invention, FIGURE 5 is a diagrammatic section showing a length of cable, whose conductor member C has been jointed or remains intact and whose insulation or sheath is to be reinstated, between A and B. The diameter of the conductor member as also the inner diameter of the sheath or insulation is Y and the outer diameter of the sheath or insulation is X, FIGURES 6 and 7 are respectively a fragmentary section and an end-on view of a pressure relief valve device, and FIGURES 8 and 9 are respectively an axial sectional view and a cross sectional view of a moulding unit having a sleeve for manual adjustment, FIGURE 10 is an explanatory diagrammatic section showing a moulding chamber with the conductor member whose thermoplastic layer is to be reinstated and the arrangement of the die apertures, one being of fixed diameter and the other adjustable, FIGURE 11 is a sectional elevation and FIGURE 12 an end elevation of a die having retractable segments suitable for reinstating the insulation of the inner conductor of a cable, FIGURE 11 showing diametrically opposite segments in different positions. In FIGURE 12 an actuating ring shown in FIGURE 11 has been omitted, FIGURE 13 is a diagram explaining relationship between radial displacement and restoring force for the aperture of a collet or retractable die, FIGURE 14 is a detail view of two devices for adjusting the mandrel, FIGURE 15 is a diagram of an electrical circuit for controlling motor speed in relation to rate of extrusion.

Referring to FIGURES 5 and 10, there is shown a conductor member or core C, on which the thermoplastic layer indicated by A or B is to be replaced or re-instated. The conductor member C may be an inner conductor or the return conductor assembly of a sheathless portion of light-weight cable which may or may not contain a joint.

The two ends of the existing portions of the thermoplastic layer are indicated at A and B. Hitherto it has not been found possible to replace or reinstate the thermoplastic layer or sheath throughout the entire length of the bared or exposed section of the conductor C, because movement of the mould from one end B to the other end A of the cable of the insulation layer is not possible.

The present invention enables the reinstated sheath (or insulation layer) to be carried along the entire length of the exposed portion of the conductor member and united to the existing sheath or insulation at the other end in a single operation.

Referring first to FIGURE 10, the mould unit has two apertures, an exit aperture 75 of constant diameter and an entrance aperture 76, 77 of variable diameter. There is also a second (fixed) entrance aperture at 78; while this latter aperture 78 is desirable in cases (a) and (c) it is essential in case (b) referred to above. The conductor member is thereby positively held in coaxial relationship with the mould throughout the operation.

Molten thermoplastic material is injected through a feed inlet 79.

At the start of the extrusion operation the mould is in the position as shown, and thermoplastic material is injected into the space 80, until it flows out of suitable spew holes 80′ provided for the purpose. It unites by fusion with the previously existing layer at B. By relative movement between the mould and the conductor member C, the thermoplastic layer can be built up around C until it reaches the end A. When the end part A of the layer enters the aperture 78, it receives additional mechanical support therefrom and prevents possible leakage when the variable aperture 77 is opened up by removal of displacement of the part 76. The sheathed conductor member is then free to enter the inner chamber 80 where it will unite by fusion with the reinstated layer. The reinstatement can thus take place in one operation instead of the two necessitated in British Patent 921,902.

In cases (a) and (c), the aperture 76 is preferably provided by a collet, as described hereinafter with reference to FIGURES 1–4 and 8–9. In case (b) the die aperture preferably consists of a radially subdivided die whose segments are capable of being withdrawn radially as hereinafter described with reference to FIGURES 11–12. In the process of opening the die, the thermoplastic material would flow too freely out of the space 80 between the segments, but the second entrance aperture 78 into which the portion A of the existing thermoplastic layer will have entered, provides an additional retaining wall.

Referring now to FIGURES 1–4 of the drawings the mould, known as a cross-head unit, comprises a block of rectangular section formed in two parts, a back part 1 and a front part 2 which together provide a cylindrical bore 3. The two parts of the block 1–2 are supported from platen means including a part P, carrying the extrusion nozzle indicated generally at N.5 is a spacing sheet of thermally insulating material.

Mounted within the bore 3 of the block 1–2 is a sleeve 6, located axially by dowels 17′. This sleeve 6 constitutes part of the extrusion chamber, corresponding to the chamber 80 in FIGURE 10, and also provides a convenient means of locating the die components 10 and 14. In the sleeve 6 and the back part 1 are openings 6′ and 1′ respectively, the opening 1′ being adapted to provide a socket for a spigot piece 8, in which the nose end of the nozzle N is located at 8′, the spigot 8 having a bore 7 to register with the opening 6′, by means of which molten thermoplastic material, e.g. polythene, is fed to the mould chamber. The extrusion unit may be driven manually or by an electric motor drive.

Provision is made for heating each part of the block 1, 2 through cartridge heaters (not shown) inserted in transverse holes H in each half of the block. Passages CW for cooling liquid are also provided, see FIGURE 2.

Detachably secured within the exit end of the sleeve or extrusion chamber 6 is the die 10, having a cylindrical bore 11 of a diameter slightly greater than that of the outer diameter of the layer to be replaced or reinstated, this corresponds to aperture 75 in FIGURE 10.

The bore 11 merges with a truncated conical or taper surface 12, which co-operates with a correspondingly conically tapered surface 13' on the conical end portion 13 of a second thinner sleeve 14, the latter sleeve having a shoulder 15 by which it is attached by socket-headed bolts 16 to the end surface of sleeve 6.

The outer diameter of sleeve 14 is such that it fits inside sleeve 6 so as to maintain both in mutual alignment, grooves being cut in its surface to form ducts 31 leading from the port 7 to an extrusion orifice 32 between surfaces 12 and 13 corresponding to 80, FIGURE 10.

A third sleeve 17, also located by dowels 17', is fitted inside and at the opposite end of the bore 3 to die 10. The axial length of sleeve 17 is such that it provides a recess in the end of bore 3 to receive the flanged end 18 of an expanding mandrel or collet 20. Sleeve 17 has an internal diameter corresponding to that of sleeve 14, both sleeves 14 and 17 being formed with axial grooves to receive the contractile fingers 24 of an expanding mandrel or collet 20. The latter is secured in position by bolts passed through holes in end flange 18 and engaging threaded holes in sleeve 17, which in turn is secured by bolts 16' to the shoulder 15 of sleeve 14.

The mandrel 20, in the embodiment shown in FIGURE 4 has four circumferentially spaced contractible fingers 24 which extend axially in the direction of die 10. These fingers 24 are located in axial slots 21 formed in sleeves 14 and 17, these slots merging in a circumferential groove 22 which is provided for convenience of machining. As will be explained later, an abutment (not shown) may with advantage be provided so that inward movement of the fingers 24 is restricted with the result that they are forced to take up a position embracing a circle whose diameter at least is equal to the internal diameter of the plastic layer.

The contractile fingers 24 at their roots enclose a circle whose diameter is slightly greater than the external diameter of the plastic layer, but as can be seen from FIGURE 4, they taper inwards gradually towards their outer or free ends, each of the fingers 24 having an arcuate surface 24' whose radius is the same as the inner radius of the plastic layer, so that they embrace the conductor member (see FIGURE 2).

By reason of the clearance between the outer surfaces of the fingers 24 and the slots 21, FIGURE 3, the fingers are capable of expansion and contraction so that they maintain the conductor member in axial alignment but will open up to accommodate minor irregularities or the other previously existing end 32 of the plastic layer. The fingers thus fulfil the function of the variable diameter entrance aperture 76 of FIGURE 10 whereas at the flange end 18 they perform the same function as the second entrance aperture 78. The fact that there is considerable space between the fingers is found to be unimportant in practice if the layer is fairly thin, for the plastic becomes viscous in contact with the cold surface of the conductor member, but with a thicker layer, as in the case of insulation reinstatement, the leakage would be more serious.

It is thus possible to build up the plastic layer on the conductor member, fusing it into the previously existing layer at each end of the portion to be reinstated, in one operation, at the same time holding the conductor member in coaxial alignment even for very long lengths of reinstatement.

In order that the apparatus shown may be mounted on the conductor member, neither of whose ends is conveniently accessible, not only the block, 1, 2, but all the annular components within it, i.e. the items 6, 10, 14/15, 17 and 18, as well as others to be described later, are slit lengthwise in at least two parts, but not necessarily all in the same place.

Pressure is maintained constant in the extrusion head by means of a relief valve device (see FIGURES 6 and 7) consisting of a plunger 40 mounted in the extrusion unit N, this plunger comprising a needle 42 which normally closes a bore 43 which opens into an enlarged duct 44 which forms a vent open to atmosphere. The plunger 40 at its other end has a nose 47 for engagement with one end of a lever 48 provided with a counter weight 50.

The force exerted by the weight 50 is sufficient normally to keep the needle 42 in position, closing the bore 43. However, when the pressure in the extrusion chamber rises above normal, it will displace the needle and open the vent 44, thus functioning as a safety valve. As described later, the movement of the needle 42 and the lever 48 (or that of any alternative loading device) may be caused to control the speed of the motor which forces the plastic material into the apparatus. By slight modification of this arrangement, it can be arranged that the position of the needle is a function of pressure, so that it will start to lift at a previously determined pressure $p_1$, but will not fully open the duct until a higher pressure $p_2$ is reached. For example a spring can be used to supply part of the force which holds the needle in position, so that as the pressure changes from $p_1$ to $p_2$ the spring is gradually compressed. With this modification not only can the venting of material be made more gradual, but control means may be actuated to regulate the speed of the extrusion feed motor or to slow down the traverse of the cross-head along the conductor member or stop it altogether until an adequate pressure has been built up. This will be described with reference to FIGURE 15.

Referring to FIGURES 8 and 9, another embodiment is shown in which the collet is so adjusted that its nose is normally open, giving an internal diameter equal to the external diameter of the plastic layer, but which may be closed manually to give an internal diameter equal to the internal diameter of the plastic layer.

The mould block, termed the cross-head, is shown at V. This as well as all the annular components associated with it, is split in two halves to enable it to be assembled around the conductor member, as already explained. The cross-head has a bore 100 with a restricted end portion 101 to receive an extrusion die 110, the exit aperture corresponding to 75, FIGURE 10. At the other end, the assembly comprises a mandrel 102 having axially extending fingers 111 and an adjusting sleeve 103, in which the mandrel 102 is relatively slideable and by means of which the sleeve may be adjusted manually to close the mandrel on to the conductor member, when introduced in the bore 100.

The closing operation of the mandrel is achieved by the camming action of a coned surface 114 of the sleeve 103 acting on conical surfaces 113 of the fingers 111 of the mandrel. The bulbous end 112 of the mandrel 102 forms the opening through which the plastic material is introduced from the chamber 130, the plastic material being injected into the chamber 130 via a tube 131 and port 132.

It will be appreciated that the fit between the conical surfaces 113, 114 is dependent partly upon the curvature of the conical surface 113, the latter necessarily being a compromise, and correct only for one particular diameter to which the mandrel may be set.

The collect or mandrel 102 is secured in a flange plate 106 by a screw thread, or by a ring and groove (both parts are split) or similar device, the flange plate 106 being secured to the mould block V by bolts shown in FIGURE 9. The sleeve 103 is cut away at one end to form two narrow arms 104 (FIGURE 9) which extend through slots 105 cut in the flange 106. Pins 115 on the arms 104 are engaged by forked ends 117 of a 2-armed lever 116 mounted by a pivot pin 119 in a bracket 120. The lever 118 is operated by a nut 122' pivotally mounted on it, the nut being traversed along a screw thread 121 on a spindle carried in a trunnion bearing 122. By rotating the spindle by a crank 123, sleeve 103 is displaced axially thereby enabling the mandrel or collect to be set manually to any desired diameter in the range for which it was designed. In this embodiment, also, the mandrel 102 has at the fixed end an internal diameter which is the same as that of the exit aperture 110, thus forming a second fixed entrance aperture, corresponding to 78 of FIGURE 10.

It will be appreciated that in this embodiment it is possible to adjust the mandrel to the exact size of the conductor member so that it can just pass freely, thus providing very accurate alignment, but in general it is found that the previous embodiment gives good results for sheath replacement and it is therefore preferred on account of its greater simplicity and convenience.

FIGURES 11 and 12 show a third embodiment for reinstating the insulation on the inner conductor, i.e. where a thick layer of plastic is required and the geometry of the finished repair has to be accurate. This embodiment may also be used for sheath repairs, but the additional complication is unnecessary in that case, and the first embodiment is preferred for this simple task.

FIGURES 11 and 12 show a modification of the arrangement described in FIGURES 1–4 in that the mandrel 20 and its flange 18 by which it is fixed to the sleeve 17 are replaced by a different form of mandrel, in the form of a die, the mandrel being cut through at four points so as to form four independent quadrants, each with one finger. Instead of providing elasticity in the fingers themselves, the four quadrants are mounted in such a way that they can be moved by fixing them resiliently, for example by springs, not shown, or by means of an arrangement to be described with reference to FIGURE 14, to the mould block 1, 2 or the sleeve 17, FIGURE 1, so that they are capable of radial displacement about pivots at or adjacent one end against the action of return springs. By providing elasticity (i.e. mounting the springs) outside the moulding chamber, there is the advantage that the springs operate at a lower temperature and that the tension can be released, controlled or even reversed, in a manner to be described. The die can also be considered as analogous to a lathe chuck in which the jaws are opened and closed by means of bell crank-levers.

Referring to FIGURES 11 and 12, the assembly consists of four quadrants 33, which may be machined from a sleeve having a flange at one end. The quadrants 33 are spaced apart to provide radial slots, in which slots four bell crank lever arms 34 are mounted on pivots provided by fulcrum pins 35. The quadrants are secured to blocks similar to the blocks 1, 2 of the mould shown in FIGURE 1, through their flanged ends by dowels indicated at 116' and bolts 116. Two of the lever arms 34 are assembled when the quadrants are fixed in position on the blocks and the remaining two arms when the blocks 1, 2 are assembled round the conductor member.

The arms 34 are formed at their outer ends with facets 36 after the manner of a 4-jawed chuck so that when rocked about their pivots they are free to take up a position with the facets abutting each other and with the control bore formed of the arcuate surfaces 140 embracing the conductor member.

To close the arms against the conductor, pressure is applied through a split thrust ring 37 the respective halves of which are shown in different positions, the ring 37 being provided with trunnion studs 38 for engagement by an actuating lever to permit of operation by mechanism similar to the mechanism including lever 118 and operating screw 121 of FIGURE 9, should manual operation be required.

In operation, when thrust ring 37 abuts against the quadrants 33, the mandrel is closed and further pressure has no further effect. The inward movement of the levers 34 is also restricted by reason of the fact that the facets 36 in their fully closed position butt together. In order to make fine adjustments and to take up wear, setscrews 39 are provided. On movement of ring 37 in direction of arrow X it engages projections 51 on the levers 34, causing the facets 36 to separate and thus increase the size of the aperture. The diameter of the opening between the arms 34 and cable is equal to the outer diameter of the layer to be applied; a fixed entry aperture corresponding to 78, FIGURE 10, is provided near the pivots of the levers 34.

The method of applying force through the thrust ring 37 to the lever arms 34 permits of many variations. It is preferred that a device be used, such that the lever arms have two positions of stable equilibrium with an intermediate position of unstable equilibrium. As will be explained in detail in connection with FIGURE 13, it is preferred that the ring 37 be resiliently forced against the levers 34 in the manner shown under normal conditions, but if the levers 34 are forced to lift by the entry of the previously existing layer of insulation, the force shall not increase appreciably, but if possible diminish. When the ring 37 is displaced beyond a certain point in its travel, the force should preferably reverse, so that the die snaps open. The objects which should be achieved in a design of this kind are as follows:

(i) When the conductor member is of normal diameter and maintained by the mandrel centralized in an axial position, there should be no friction on its surface.

(ii) When the conductor member departs from the central axial position by more than e.g. five one-thousandths of an inch, there should be a strong restoring force tending to centralize it.

(iii) If a small irregularity is present, the device should not jam, but seek to centralize the conductor with its irregularity.

(iv) If there is a very large increase of diameter (existing layer of plastic material) the die should snap open with as little scoring or other damage as possible.

These objects apply also to other embodiments, although of course it is difficult to provide facility (iv) in the case of a mandrel or collet situated in the moulding chamber and depending on its own elasticity.

The relationship between force and displacement, together with schematic diagrams indicating a few of the mechanisms with suitable characteristics, are shown in FIGURES 13 and 14.

The ordinate of FIGURE 13 represents the force acting on the conductor member exerted by the collet or die, and the abscissa represents radial displacement of the contact surface of the collet or die, taking as zero the surface of a truly cylindrical conductor member in an exactly coaxial position.

The curve A shows the relationship for a mandrel of fixed diameter, such as the solid mandrel of British Patent 921,902 or the manually operated one of the second embodiment. In this case a clearance must be provided, but the aperture of the mandrel or collet will exert an unlimited force for any displacement beyond the clearance. Conditions (i) and (ii) are satisfied but not (iii) or (iv).

Curve B shows the characteristic of a spring collet of the type considered so far, in the first embodiment. Although the device has been found to work satisfactorily, none of the requirements except (iii) are fully satisfied. It is not possible to have zero friction on the conductor and yet have a large restoring force for small displacements and a reasonable force when the previously existing layer of plastic enters. Hooke's law applies, and there are only two variables to fit the four conditions represented by statements (i) to (iv). One can only choose the initial clearance and the stiffness of the fingers. The best that one can achieve is a compromise.

Another variable can be introduced by arranging a stop which fixes the clearance of the collet or die opening thus making it possible to choose the initial tension and the stiffness of the spring independently. This enables a curve such as C to be obtained. This fulfills (i), (ii) and (iii) and improves the performance as regards (iv).

If one considers the device shown schematically in FIGURE 14, for example a weighted lever or an iron armature arranged between two sets of permanent magnets, it is clear that some non-linear relationship such as that shown at D can be achieved; at first there is a fairly constant force for a small displacement beyond the clearance fixed by the abutment. As the weighted lever becomes vertical or the armature reaches a position midway between the magnets, the force becomes zero and the equilibrium is unstable. A slight further displacement will reverse the force and cause the die to open. Similar effects can be produced by servo mechanisms, e.g. pneumatic, hydraulic or electrical actuators, whose motion is controlled by a switch at a certain predetermined displacement.

A large number of solutions to the problem of providing a force on the thrust ring 37 may readily be devised by one skilled in the art. There is a slight preference for the permanent magnet arrangement on account of its reliability, freedom from vibration troubles, compactness and absence of power requirements.

To provide an abutment for the first embodiment FIGURE 1, all that is necessary is to place a small obstruction, for example a pin, at the back of the nose-piece 13 within the chamber 22, so as to engage a corresponding projection on the tip of each finger. The collet is made more flexible than would otherwise be the case, and the fingers would be set to engage a diameter much smaller than that of the conductor member, when not restrained by the abutment. When each half of the mandrel is assembled in the slots of the split sleeves 14, 17, the fingers are pressed open so as to clear the pins before the flange 18 is forced into position. The fingers are now constrained to provide a small clearance round the conductor member, but are not prevented from expanding. The two halves of the sub-assembly can now be fixed over the conductor member in the normal way.

Referring to FIGURE 15, a simple control scheme is shown whereby the whole injection process may be controlled automatically. It has already been stated that the drive by which the rate of injection of thermoplastic material and the relative (traversing) movement of the cable and the mould could be controlled automatically. By providing separate motors marked "Injection" and "Traverse" respectively in FIGURE 15, one of which controls the injection pressure and the other the haul off, it is possible by suitably chosen gearing for the volume per minute of thermoplastic leaving the injection gun to be approximately equal to the volume per minute of plastic layer leaving the cross-head, so that equal amounts are injected when both motors are running at normal speed. The motors are of the constant speed type, whose speed does not vary greatly with torque. The diagram shows single-phase connections for the sake of simplicity.

The spring loaded plunger may be similar to the plunger 42 (FIGURE 6). If excessive pressure is generated this plunger will operate, allowing excess material to escape through a vent to atmosphere as already described. Movement of the plunger 42 operates microswitches B varying the current supplied to the injection motor, causing the extruder screw to slow down, thereby reducing pressure. If pressure becomes too low, the pressure switch will cause microswitch A to open thereby slowing down or stopping the traverse motor.

In operation, when the mould has been assembled, the electric heating circuit is switched on to supply current to the resistance R (FIGURES 1-2). As soon as the thermoplastic is molten, the main switch MS is closed. At the outset pressure is nil, contacts A' will thus be open, but contacts B' will be closed. When pressure in the molten material has built up, A' will close and traverse will commence. The switches A and B will now both remain closed unless the pressure becomes too high or too low, whereupon one or other of the motors will be slowed down to correct the fault. If the mandrel is operated manually, as described in the second embodiment above, the limit switch LS1 does not operate at the moment when the mandrel is opened, but it does operate to stop the traverse at the correct moment if the system is adapted for manual operation. When the aperture is open, switch G is closed manually, whereupon the operation proceeds to completion, preferably until limit switch LS2 operates; limit switches being closed by the motion of the cross-head. A device of this kind is also applicable to the main invention.

When operating the apparatus in which the mandrel opens up automatically, as described in FIGURES 1-4 or 11-12, the limit switch LS1 and the switch G are not necessary. After the mandrel opens, the injection motor will slow down and stop because of the reduced consumption of material and the consequent rise in pressure. It will then operate intermittently to maintain pressure. As an optional feature it could be arranged to switch off the heating and switch on the cooling fluid by the operation of LS2 or some other limit switch.

What we claim is:

1. Method of applying a layer of thermoplastic insulation to an exposed portion of a conductor member of an electric cable or the like, which conductor member already is covered by an existing layer of thermoplastic material except at said exposed portion, said existing layer having two spaced ends at opposite ends of said exposed portion of said conductor member, said method comprising enclosing said exposed portion of the conductor member in a demountable mould having an extrusion chamber the length of which is relatively small in relation to the length of said exposed portion, said mould extrusion chamber having, in coaxial alignment, an entrance die of variable diameter which is adjustable within a range including the inner and outer diameters respectively of the thermoplastic layer to be applied, and an exit die of constant diameter substantially equal to the external diameter of said layer; locating the mould extrusion chamber and conductor member at the start of the operation with one end of said existing plastic layer in the exit die; injecting thermoplastic material in a molten condition into the mould extrusion chamber so that it unites with said thermoplastic layer at said one end thereof; effecting relative longitudinal movement of the mould extrusion chamber with respect to the conductor member so that the conductor member passes through the mould extrusion chamber from the entrance die toward the exit die and leaves at the exit die with the applied thermoplastic layer in position on said conductor portion, the entrance die engaging said conductor member and maintaining the latter in an axial position relative to said mould extrusion chamber during extrusion; effecting adjustment of the internal diameter of said entrance die to substantially the outer diameter of the other end of said existing plastic layer when the latter arrives at said entrance die; and effecting entrance of said other end of said existing plastic layer through said entrance die into said mould extrusion chamber and uniting said other end of said existing plastic layer with the molten plastic in said mould extrusion chamber.

2. A method according to claim 1 in which said mould is stationary and said conductor member is moved through said mould.

3. Apparatus for applying a layer of thermoplastic insulation to an exposed portion of a conductor member of an electric cable or the like, which conductor member already is covered by an existing layer of thermoplastic material except at said exposed portion, said existing layer having two spaced ends at opposite ends of said exposed portion of said conductor member, said apparatus comprising: a split crosshead having a bore within which is an extrusion chamber adapted to enclose said conductor member and to enable relative movement of said conductor member and said split crosshead longitudinally of said conductor member, said chamber having an exit end provided with an exit extrusion die of constant diameter corresponding to the outer diameter of the thermoplastic layer to be applied and an inlet end provided with an inlet extrusion die of variable diameter adjustable within a range including the inner and outer diameters respectively of the thermoplastic layer to be applied, whereby when said inlet extrusion die is adjusted to the inner diameter of the thermoplastic layer said inlet extrusion die is adapted to engage the exposed portion of said conductor member for maintaining the latter in an axial position relative to said extrusion chamber during relative longitudinal movement of said conductor member and said split crosshead, and when said inlet extrusion die is adjusted to the outer diameter of the thermoplastic layer one of said ends of said existing layer of thermoplastic material may pass relatively through said inlet extrusion die into said extrusion chamber; said apparatus comprising a mandrel mounted within said crosshead bore in axial alignment with said exit extrusion die and comprising axially extending contractile fingers; said apparatus further including a sleeve element mounted within said crosshead bore for axial displacement relative to said mandrel, said fingers and said sleeve being formed with mutually cooperating surfaces operable upon axial displacement of said sleeve element relative to said mandrel for effecting expansion and contraction of said fingers; and means for injecting thermoplastic material into said extrusion chamber in molten condition.

4. Apparatus according to claim 3 in which said sleeve element is a guide sleeve formed with axially extending slots accommodating said mandrel fingers.

5. Apparatus for applying a layer of thermoplastic insulation to an exposed portion of a conductor member of an electric cable or the like, which conductor member already is covered by an existing layer of thermoplastic material except at said exposed portion, said existing layer having two spaced ends at opposite ends of said exposed portion of said conductor member, said apparatus comprising: a split crosshead having a bore within which is an extrusion chamber adapted to enclose said conductor member and to enable relative movement of said conductor member and said split crosshead longitudinally of said conductor member, said chamber having an exit end provided with an exit extrusion die of constant diameter corresponding to the outer diameter of the thermoplastic layer to be applied and an inlet end provided with an inlet extrusion die of variable diameter adjustable within a range including the inner and outer diameters respectively of the thermoplastic layer to be applied, whereby when said inlet extrusion die is adjusted to the inner diameter of the thermoplastic layer said inlet extrusion die is adapted to engage the exposed portion of said conductor member for maintaining the latter in an axial position relative to said extrusion chamber during relative longitudinal movement of said conductor member and said split crosshead, and when said inlet extrusion die is adjusted to the outer diameter of the thermoplastic layer one of said ends of said existing layer of thermoplastic material may pass relatively through said inlet extrusion die into said extrusion chamber; said inlet extrusion die being provided by a collet having circumferentially spaced axially extending fingers movable from a closed position corresponding to the inner diameter of the thermoplastic layer to be applied to an open position corresponding to the outer diameter of said layer, said collet comprising an annular head and in which said fingers comprise levers pivotally mounted on said head, one arm of each finger lever being formed with a radial facet and arcuate tip, whereby when said finger levers are in their closed positions said arms interlock with each other and provide a cylindrical aperture; and means for injecting thermoplastic material into said extrusion chamber in molten condition.

6. Apparatus according to claim 5 including a thrust ring for controlling the pivotal movement of said finger levers from their closed positions to their open positions and vice versa.

7. Apparatus according to claim 6 including adjustable stop means for limiting the movement of said finger levers to their closed positions.

8. Apparatus according to claim 6 including means for varying the force exerted through said thrust ring upon said mandrel fingers for contracting the latter.

9. Apparatus according to claim 6 comprising means including a resilient device for applying force to said thrust ring to displace it in a direction to contract said mandrel fingers and for controlling the applied force to be substantially constant on initial movement of said fingers from contracted positions, to be reduced during the remainder of the movement of said fingers toward their expanded positions, and to become essentially zero thereafter to facilitate withdrawal of said fingers to their fully expanded positions.

References Cited

UNITED STATES PATENTS

| 1,100,002 | 6/1914 | Van Ness | 18—13 |
| 1,583,815 | 5/1926 | Trebes | 264—36 |
| 1,987,963 | 1/1935 | Malm | 264—36 |
| 1,993,384 | 3/1935 | Royle | 18—13 |
| 2,340,808 | 2/1944 | Gruetjen | 18—13 |
| 2,716,623 | 8/1955 | Tator | 264—263 |

FOREIGN PATENTS

| 921,901 | 3/1963 | Great Britain. |
| 921,902 | 3/1963 | Great Britain. |

ROBERT F. WHITE, *Primary Examiner.*

L. S. SQUIRES, T. J. CARVIS, *Assistant Examiners.*